United States Patent [19]

Pretnick

[11] 4,246,982
[45] Jan. 27, 1981

[54] CAR RAMP AND DRIP PAN ASSEMBLY

[76] Inventor: George Pretnick, 3231 W. 153rd St., Cleveland, Ohio 44111

[21] Appl. No.: 44,502

[22] Filed: Jun. 1, 1979

[51] Int. Cl.³ .............................................. F16N 31/00
[52] U.S. Cl. ...................................... 184/106; 180/69.1
[58] Field of Search ....................... 184/106, 6; 296/38; 104/133; 180/69.1; 222/108

[56] References Cited

U.S. PATENT DOCUMENTS

| | | | |
|---|---|---|---|
| 1,704,917 | 3/1929 | McCullough et al. | 296/38 X |
| 2,497,565 | 2/1950 | Stark | 184/106 UX |
| 2,938,602 | 5/1960 | Horrocks | 184/106 |
| 2,990,033 | 6/1961 | Arnold | 184/106 |
| 2,996,150 | 8/1961 | Cassem | 184/106 |
| 3,044,575 | 7/1962 | Minutillo | 184/106 |
| 3,661,227 | 5/1972 | Robel et al. | 184/106 |
| 3,834,527 | 9/1974 | Howe | 184/106 X |

*Primary Examiner*—David H. Brown
*Attorney, Agent, or Firm*—Baldwin, Egan, Walling & Fetzer

[57] ABSTRACT

A car ramp and drip pan assembly for placement under parked motor vehicles to catch fluid and particle drippings therefrom including a rectangular tray for catching the drippings, a pair of elongated racks positioned in the tray parallel to the sides of the tray and upon which the vehicle is driven thus spacing the vehicle wheels above the bottom of the tray so that the wheels do not touch the drippings, and a ramp connected to the entrance edge of the tray enabling easy entry of a vehicle onto the racks. A pair of tire stops is selectively positionable on the racks for stopping the vehicle at a predetermined position on the assembly. The tray perimeter is formed of a continuous upstanding flange to contain the drippings within the tray. The ramp has a transverse slot formed in its underside to coactively fit onto the flange on the entrance edge of the tray. The racks and ramp have their upper surfaces corrugated to provide traction for the vehicle wheels. The tray has a garden hose drain attachment formed in the tray flange at an end of the tray to drain the drippings from the tray. The ramp and racks have their top surfaces coated with luminous material enabling easy visual entry of a vehicle on the assembly in darkness. The racks also have electrical heating elements formed therein to melt accumulated snow and ice thereon enabling quick draining of such melted snow and ice via the garden hose drain attachment.

11 Claims, 7 Drawing Figures

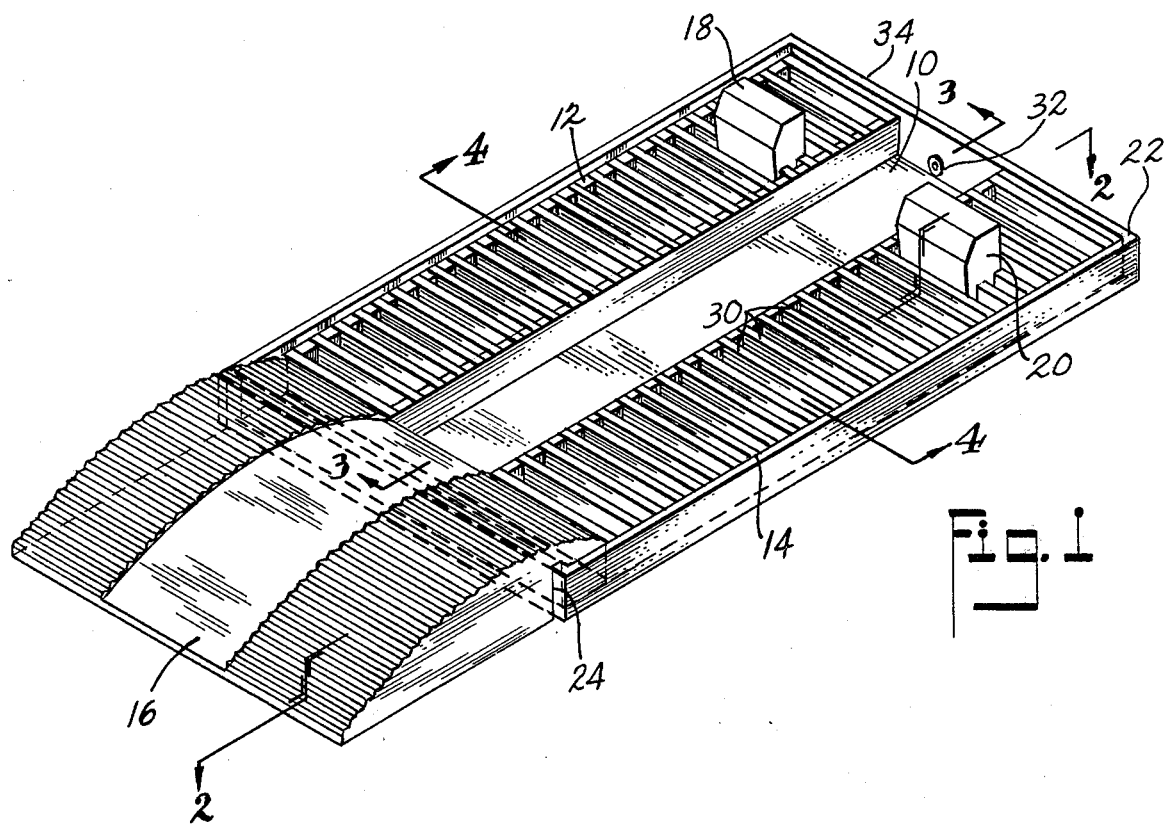
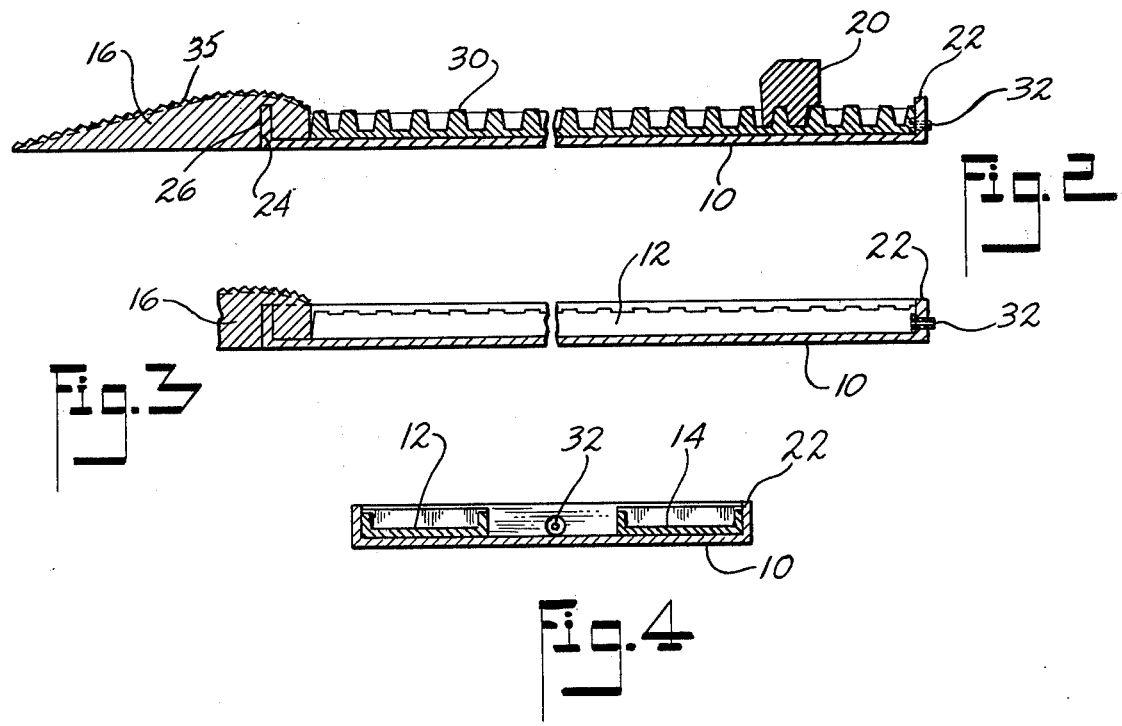

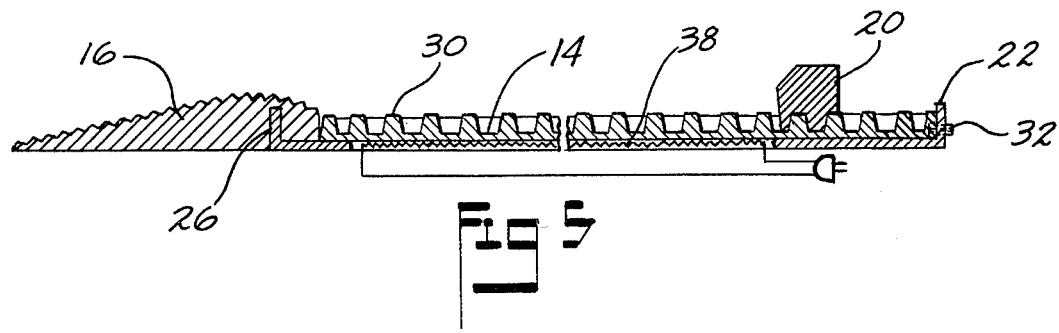
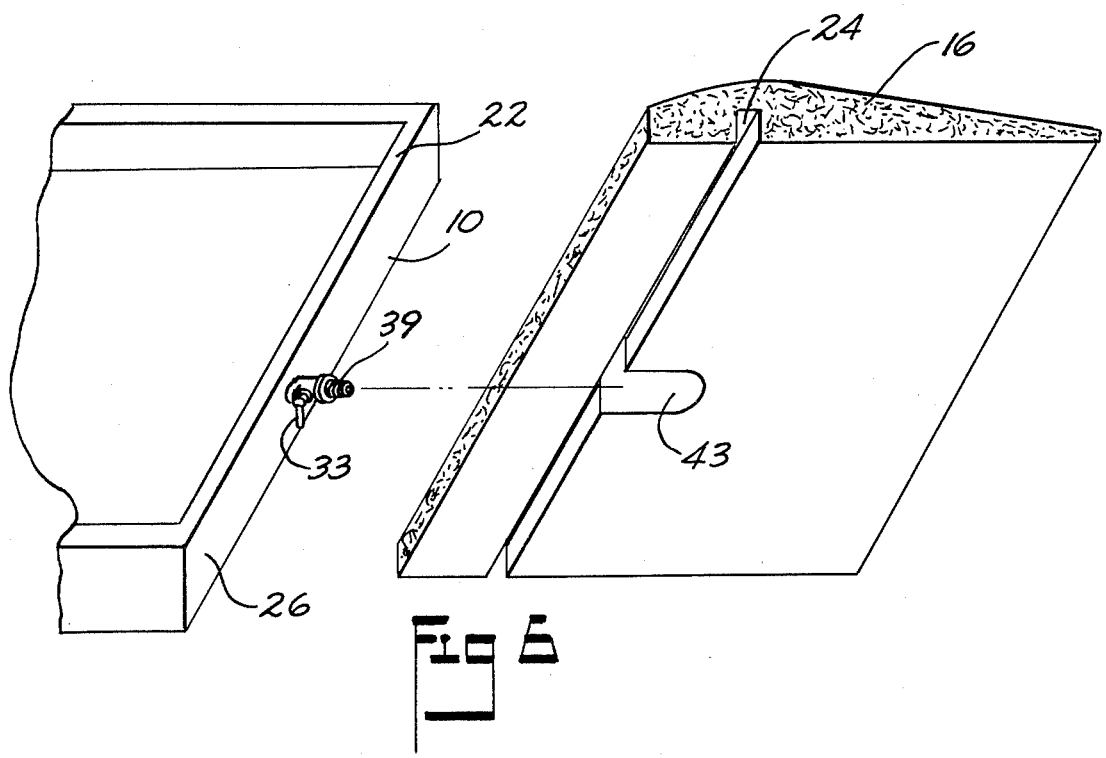
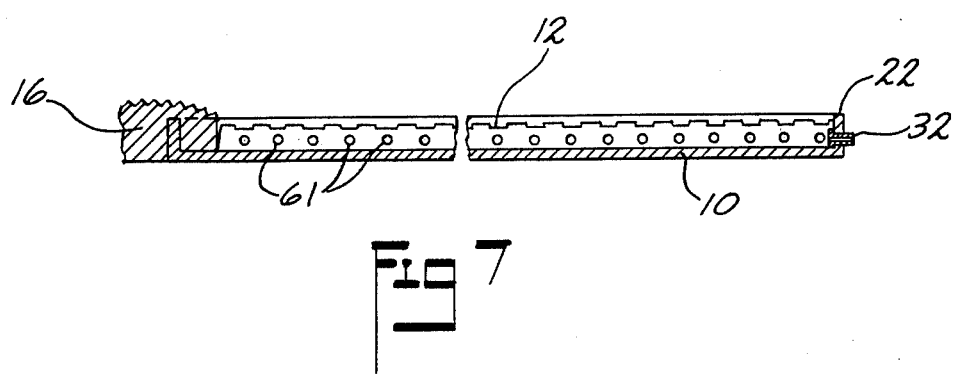

CAR RAMP AND DRIP PAN ASSEMBLY

This invention relates to vehicle drip pans and more particularly to a car ramp and drip pan assembly for placement under a parked motor vehicle to catch fluid and particle drippings therefrom, thereby maintaining areas such as garage floors, driveways, factory flooring and the like free of oil and other sludge deposits from equipment leaks.

BACKGROUND OF THE INVENTION

There has long been a need for an effective and economical vehicle drip pan assembly that collects both fluid and particle drippings from the car and has means for easily flushing and draining away such drippings, thereby obviating the problems attendant with automobile engine oil drippings, salt, snow and mud drippings, e.g. soiling and staining of garage floors, the most serious consequence thereof being the tracking of oil and sludge from the garage floor into the home and into the interior of the car.

Any vehicle powered by an internal combustion engine inevitably sooner or later leaks oil, usually from the crankcase, but also often from the transmission and other parts. Such oil drips soak into concrete and asphalt surfaces on which the vehicles are parked to stain the surface and create a possible fire hazard.

Drip trays have been provided heretofore for catching oil drippings beneath motor vehicles, but these have been open to the objection that they are difficult and obnoxious to clean, so that they are often used without cleaning long after they should have been cleaned or thrown away. Additionally, known trays have tended to skid or become displaced from the proper position underneath the motor vehicle so that they are run over by the tires of the vehicle and broken, or are not properly positioned to catch the drippings.

SUMMARY OF THE INVENTION

It is the general object of the present invention to avoid and overcome the foregoing and other difficulties of and objections to prior art practices by the provision of an improved car ramp and drip pan assembly for use underneath motor vehicles, and the like, and characterized by lightweight and stability of positioning.

A further object of this invention is to provide a car ramp and drip pan assembly capable of neatly and efficiently collecting and retaining waste oil, road salt, and melted snow and providing means for effecting its ready disposal.

Another object of the present invention is to provide a car ramp and drip pan assembly which is tidy and attractive during use and which is readily cleanable.

Another object of the invention is the provision of a drip pan which conducts drippings to the bottom and center of the pan and maintains a clean appearance on top, and leaves the tires sludgeless.

A further object of the invention is to provide an oil drip catcher which is not liable to become damaged or to cause damage to an automobile or to spill oil on the floor if the catcher is accidentially run over.

A further object of my invention is to provide a car ramp and drip pan assembly which will entrap both fluid and particle drippings from the car, and which assembly can then be readily flushed and drained with a garden hose.

A further object of the invention is to provide a car ramp and drip pan assembly of the above type on which accumulated ice and snow falling from the vehicle may be quickly melted and thence collected in the center of the tray and thence drained from the tray with a garden hose.

A further object of the invention is to provide a car ramp and drip pan assembly of the above type that can be easily seen and driven onto in darkness.

A further object of the invention is to provide a car ramp and drip pan assembly of the above type that is simple in construction, easy to manufacture, and highly effective in operation.

Briefly, the foregoing objects are accomplished by the provision of a garage floor ramp and drip pan assembly for placement under parked motor vehicles to catch fluid and particle drippings therefrom. The assembly is preferably formed of a thermoplastic material and includes a rectangular tray for catching the drippings, such tray having a pair of elongated racks positioned parallel to the sides of the tray and upon which the vehicle is driven, thus spacing the vehicle wheels above the bottom of the tray so that the wheels do not touch the drippings. A ramp is connected to the entrance edge of the tray enabling easy entry of a vehicle onto the racks. A pair of tire stops is selectively positionable, respectively, on the racks for stopping the vehicle at a predetermined position on the assembly. The tray has its perimeter formed of a continuous upstanding flange to contain the drippings within the tray. The ramp has a transverse slot formed in its underside to coactively fit onto the flange on the entrance edge of the tray. The ramp and racks have their upper surfaces corrugated to provide traction for the vehicle wheels. The tray has a drain attachment to drain the drippings from the tray. The ramp and racks have their top surfaces formed of a luminous material enabling easy entry of a vehicle on the assembly in darkness. The racks also have electrical heating elements formed therein to melt accumulated snow and ice thereon enabling quick draining of such snow and ice onto the tray and out the drain attachment.

Other objects and advantages of the invention will be apparent from the following description taken in conjunction with the drawings wherein,

BRIEF DESCRIPTION OF THE DRAWINGS

FIG. 1 is a perspective view of a car ramp and drip pan assembly constructed in accordance with the invention;

FIG. 2 is a view taken along the line 2—2 of FIG. 1;

FIG. 3 is a view taken along the line 3—3 of FIG. 1;

FIG. 4 is a view taken along the line 4—4 of FIG. 1;

FIG. 5 is a view similar to FIG. 2, but showing a modification thereof;

FIG. 6 is a perspective view showing the ramp attachment to the tray and showing the recess in the ramp underside to accommodate the tray drain attachment, and FIG. 7 is a view similar to FIG. 3, but showing a modification thereof.

In the drawings, like numbers and letters are used to illustrate like and similar parts throughout the several views.

DESCRIPTION OF PREFERRED EMBODIMENTS

Referring first to FIGS. 1 through 4, there is shown a garage floor ramp and drip pan assembly A, of the invention, for placement under parked motor vehicles to catch fluid and particle drippings therefrom. The assembly A includes as basic components, a planar rectangular tray 10 for catching the drippings, a pair of elongated racks 12 and 14 positioned parallel to the sides of the tray 10 and upon which an associated vehicle is driven and parked, a ramp 16 connected to an end edge of the tray enabling facile entry of a vehicle onto the racks, and a pair of tire stops 18 and 20 selectively positionable respectively on the racks for stopping the vehicle at a predetermined position on the assembly.

The tray 10 has its perimeter formed of a continuous upstanding flange 22 to contain the drippings within the tray. The ramp 16 has a transverse slot 24 formed in its underside to coactively fit onto the flange 22 on the entrance edge 26 of the tray. The ramp 16 has corrugations 35, and the racks 12 and 14 have corrugations 30 in their upper surfaces to provide traction for the vehicle wheels.

The tray 10 has a garden hose drain attachment 32 formed in the flange 22 at the end 34 of the tray to selectively drain the drippings from the tray. The tray 10 is large enough to hold a full winter's supply of sludge.

The ramp 16 and the racks 12 and 14 may have their top surfaces formed of or coacted with a luminous material enabling easy entry of a vehicle on the assembly A in darkness.

A suitable adhesive may be applied to the under surface of the tray 10 and ramp 16 to detachably secure and maintain the tray and ramp in a preselected position on the garage floor.

Referring to FIG. 5, the racks 12 and 14 may have electrical heating elements 38 formed therein to melt accumulated snow and ice thereon enabling quick draining thereof out the drain attachment 32.

In the modification shown in FIG. 6, the garden hose drain attachment 39 (having a flow control valve 33) is secured to the entrance end 26 of the tray 10, and the ramp 16 is provided with a recess 43 to accomodate such attachment when the ramp is positioned on the tray as aforedescribed.

In the modification shown in FIG. 7, the inner sides of the racks 12 and 14 may be provided with drain holes 61 to provide drainage of the dripping from the racks, thence into the center of the tray 10, and thence out the garden hose drain attachment.

The terms and expressions which have been employed are used as terms of description, and not of limitation, and there is no intention, in the use of such terms and expressions, of excluding any equivalents of the features shown and described or portions thereof, but it is recognized that various modifications are possible within the scope of the invention claimed.

I claim:

1. A car ramp and drip pan assembly for placement under parked motor vehicles to catch fluid and particle drippings therefrom comprising, a planar rectangular tray for catching the drippings, said tray having a pair of elongated racks positioned parallel to the sides of the tray and upon which the vehicle is driven and parked, whereby the vehicle wheels are spaced above the bottom of the tray so that the wheels do not touch the vehicle drippings, and a ramp connected to an end edge of the tray enabling facile entry of a vehicle onto the racks.

2. The structure of claim 1 and further including a pair of tire stops selectively positionable respectively on the racks for stopping the vehicle at a predetermined position on the assembly.

3. The structure of claim 1 wherein the upper surfaces of the ramp and racks are corrugated to provide traction for the vehicle wheels.

4. The structure of claim 1 wherein said assembly is formed of a thermoplastic material.

5. The structure of claim 1 wherein the top surface of said ramp and said racks is coated with a luminous material enabling facile entry of a vehicle on the assembly in darkness.

6. The structure of claim 1 wherein said tray and said ramp have an adhesive applied to their under surface to maintain them in position.

7. The structure of claim 1 wherein the perimeter of the tray is formed of a continuous upstanding flange to contain the drippings within the tray.

8. The structure of claim 7 wherein the ramp has a transverse slot formed in its underside to coactively fit onto the flange on the entrance end of the tray.

9. The structure of claim 1 wherein said tray has a flow controllable drain attachment formed in the flange at an end of the tray to selectively drain the drippings from the tray.

10. The structure of claim 9 wherein said tire racks have electrical heating elements formed therein to melt accumulated snow and ice thereon enabling quick draining of such snow and ice onto the tray and out the drain attachment.

11. A car ramp and drip pan assembly for placement under parked motor vehicles to catch fluid and particle drippings therefrom comprising, a planar rectangular tray for catching the drippings, said tray having a pair of elongated racks positioned parallel to the sides of the tray and upon which the vehicle is driven and parked whereby the vehicle wheels are spaced slightly above the bottom of the tray so that the wheels do not touch the drippings, a ramp connected to an entrance end of the tray enabling facile entry of a vehicle onto the racks, and a pair of tire stops selectively positionable respectively on the racks for stopping the vehicle at a predetermined position on the assembly, said tray having its perimeter formed of a continuous upstanding flange to contain the drippings within the tray, said ramp having a transverse slot formed in its underside to coactively fit onto the flange on the entrance end of the tray, said ramp and racks having their upper surfaces corrugated to provide traction for the vehicle wheels, said tray having a garden hose drain attachment formed in the flange at an end of the tray to selectively drain the drippings from the tray, said assembly being formed of a thermoplastic material, said ramp and said racks having their top surfaces coated with a luminous material enabling facile entry of a vehicle on the assembly in darkness, said racks having electrical heating elements formed therein to melt accumulated snow and ice thereon enabling quick draining of such snow and ice onto the tray and out the drain attachment.

* * * * *